US006491129B1

(12) United States Patent
Young et al.

(10) Patent No.: US 6,491,129 B1
(45) Date of Patent: Dec. 10, 2002

(54) AGRICULTURAL TRACTOR WITH DRAFT COMPENSATING SUSPENSION

(75) Inventors: Donald Eugene Young, Cedar Falls, IA (US); Ronnie Franklin Burk, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/803,602

(22) Filed: Mar. 9, 2001

(51) Int. Cl.$^7$ ............................................. B60K 17/16
(52) U.S. Cl. ................ 180/361; 180/900; 280/124.104; 280/124.135; 280/124.156; 172/439
(58) Field of Search .................. 280/124.104, 124.111, 280/124.112, 124.135, 124.136, 124.138, 124.139, 124.141, 124.143, 124.156; 180/348, 359, 360, 361, 900; 172/439

(56) References Cited

U.S. PATENT DOCUMENTS

| | | | | |
|---|---|---|---|---|
| 3,806,141 A | * | 4/1974 | Louis et al. ............. | 280/6.154 |
| 4,124,079 A | * | 11/1978 | Crow .......................... | 180/900 |
| 4,355,697 A | * | 10/1982 | Orlandea et al. ............ | 180/261 |
| 4,423,886 A | * | 1/1984 | Taylor ......................... | 172/439 |
| 4,639,008 A | * | 1/1987 | Krettenauer et al. ..... | 280/405.1 |
| 4,982,799 A | * | 1/1991 | Fujimoto et al. ........... | 180/900 |
| 5,538,264 A | | 7/1996 | Brown et al. | |
| 5,931,486 A | * | 8/1999 | Andreis ............... | 280/124.139 |
| 6,105,984 A | * | 8/2000 | Schmitz et al. ........ | 280/124.136 |
| 6,131,919 A | * | 10/2000 | Lee et al. ................ | 280/6.154 |

FOREIGN PATENT DOCUMENTS

| | | |
|---|---|---|
| DE | 38 34 693 A1 | 6/1989 |
| DE | 39 01 757 A1 | 8/1989 |
| DE | 39 37 938 A1 | 5/1990 |
| JP | 56-95712 * | 8/1981 |

OTHER PUBLICATIONS

7000 Ten Series Tractor Brochure By John Deere, Jun. 2001, 31 Pages.
Race Car Vehicle Dynamics, William F. Milliken & Douglas L. Milliken. pp. 617 to 620. Society of Automative Engineers, Inc.
Tires, Suspension and Handling, Second Edition, John C. Dixon. Society of Automotive Engineers, Inc. Section 5.12.
Motor Vehicle Dynamics, Modeling and Simulation, Giancarlo Genta. pp. 348 to 357. World Scientific.
Fundamentals of Vehicle Dynamics, Thomas D. Gillespie. pp. 240 to 257. Society of Automotive Engineers, Inc.

* cited by examiner

Primary Examiner—Peter C. English

(57) ABSTRACT

An agricultural tractor having a rear suspension with draft compensating geometry to control the compression or extension of the rear suspension in response to a draft load. The draft compensating suspension enables the tractor hitch to be mounted on the suspended frame or chassis of the tractor rather than mounting the hitch to a non-suspended beam axle or locking out the suspension during draft work. The draft load is applied to the chassis by a ground engaging implement. The tractive load and torque at the rear wheels are reacted through the side view instantaneous center of the rear suspension. The placement of the instantaneous center will determine the suspension reaction to the wheel load and torque. Locating the suspension instantaneous center on a line of 100% draft-compensation will eliminate the motion of the suspension due to the draft load. If the instantaneous center is located below the 100% draft-compensation line, the suspension will compress under a draft load. If the instantaneous center is located above the 100% draft-compensation line, the suspension will extend under a draft load. The distance between the instantaneous center and the 100% draft compensation line will determine the amount of compression or extension of the suspension.

7 Claims, 6 Drawing Sheets

AGRICULTURAL TRACTOR WITH DRAFT COMPENSATING SUSPENSION

BACKGROUND OF THE INVENTION

1. Field of the Invention

The present invention relates to an agricultural tractor having a rear suspension and in particular a draft compensating rear suspension in which the suspension is designed to reduce or minimize the effect of draft loads on the tractor attitude by minimizing compression or extension of the rear suspension.

2. Description of the Related Art

An agricultural tractor is intended primarily for off-road usage and is designed primarily to supply power to agricultural implements. An agricultural tractor propels itself and provides a draft force in the direction of travel to enable an attached, soil engaging, implement to perform its intended function. Furthermore, an agricultural tractor may provide mechanical, hydraulic and/or electrical power to the implement. Agricultural tractors must be designed with sufficient normal force, i.e. a down force, acting on the drive wheels to produce the needed draft force. Agricultural tractors differ from cargo carrying vehicles, such as pickup trucks and semi-truck tractors, in that trucks are not designed to produce a continuous draft load. A truck only needs to produce a draft load during periods of acceleration and deceleration and relies on the weight of the cargo to produce the normal force on the drive wheels.

There is a continuous desire to increase the productivity of agricultural tractors. Productivity can be increased by tractor designs that maintain tire-soil contact force when traversing uneven terrain, both during field operations and during road transport. To maintain tire-soil contact force on an uneven terrain, it is necessary to provide a suspension system to allow the tires to follow the terrain. When a suspension is added to an agricultural tractor, between the chassis and the wheels, with the hitch on the suspended chassis, an undesirable interaction occurs between the suspension and draft load. The draft load reaction through the suspension tends to force the rear suspension into jounce, i.e. the suspension compresses, causing the wheels to move upward relative to the suspended chassis. As the suspension compresses, the pulled implement, such as a plow, runs deeper, increasing the draft load. The higher the draft load, the more the rear suspension compresses until it is fully compressed. Once fully compressed, the suspension no longer provides a benefit. If the suspension is only partially compressed, it will still reduce the amount of suspension travel available to maintain tire-soil contact force and to improve the tractor ride. Suspension compression also affects the clearance under the vehicle, the height of the drawbar and hitch above the ground plane, and the attitude of the tractor.

The interaction between the suspension and draft load can interfere with the proper operation of hitch controls. When the hitch control senses the need to reduce the depth of the implement in the ground, the suspension compresses, instead of raising the implement. The reverse is true if the hitch control senses the need to lower the implement.

One way to overcome the problem of suspension compression is to provide a system that compensates for the draft load by extending the suspension. This is accomplished by adding hydraulic fluid to the system to return the suspension to a center position, whereby suspension travel in each direction is still available. However, this significantly increases the spring rate of the suspension under a draft load, resulting in a harsher ride. Furthermore, adding and removing fluid to a circuit with an accumulator results in a large energy waste.

Another solution is to provide a rigid beam axle mounted to the chassis through the suspension and mount the hitch to the unsuspended beam axle. This avoids reacting of the draft load through the suspension. However, the implement will not receive the benefit of the suspension and will follow the motion of the axle.

Yet another alternative is to provide a means to lock out the suspension when performing draft work. This eliminates all benefits of the suspension.

All of the above solutions to the interaction of the suspension to the draft load reduce the effectiveness and benefit of the rear suspension.

SUMMARY OF THE INVENTION

The present invention relates to an agricultural tractor having a rear suspension with draft compensating geometry to control the compression of the rear suspension in response to a draft load. The draft load is applied to the chassis by a ground engaging implement. The tractive load and torque at the rear wheels are reacted through the side view instantaneous center of the rear suspension. The placement of the instantaneous center affects the chassis reaction to the wheel load and torque. Locating the suspension instantaneous center on a line of 100% draft-compensation will eliminate the motion of the suspension due to the draft load. If the instantaneous center is located below the 100% draft-compensation line, the suspension will compress under a draft load, whereas if the instantaneous center is located above the 100% draft-compensation line, the suspension will extend under a draft load. The distance between the instantaneous center and the 100% draft compensation line will determine the amount of compression or extension of the suspension. An expected response to the draft load is to compress the suspension. In a tractor without a suspension, the draft load typically compresses the rear tires. By properly locating the instantaneous center of the suspension, an opposing force is created to counteract, completely or partially, the suspension compression.

The draft compensating suspension geometry can be used to eliminate or reduce the amount of suspension travel used to react to the draft load. As a result, the suspension will have travel available to react to irregular terrain profiles, which provides the operator with better ride and control. It also permits the suspension to be less stiff to terrain inputs. A draft compensating suspension also reduces the interaction between the suspension and the hitch draft control system. A draft compensating geometry eliminates the need for complex control systems to control suspension height and vehicle attitude.

DETAILED DESCRIPTION OF THE INVENTION

Figure 1:
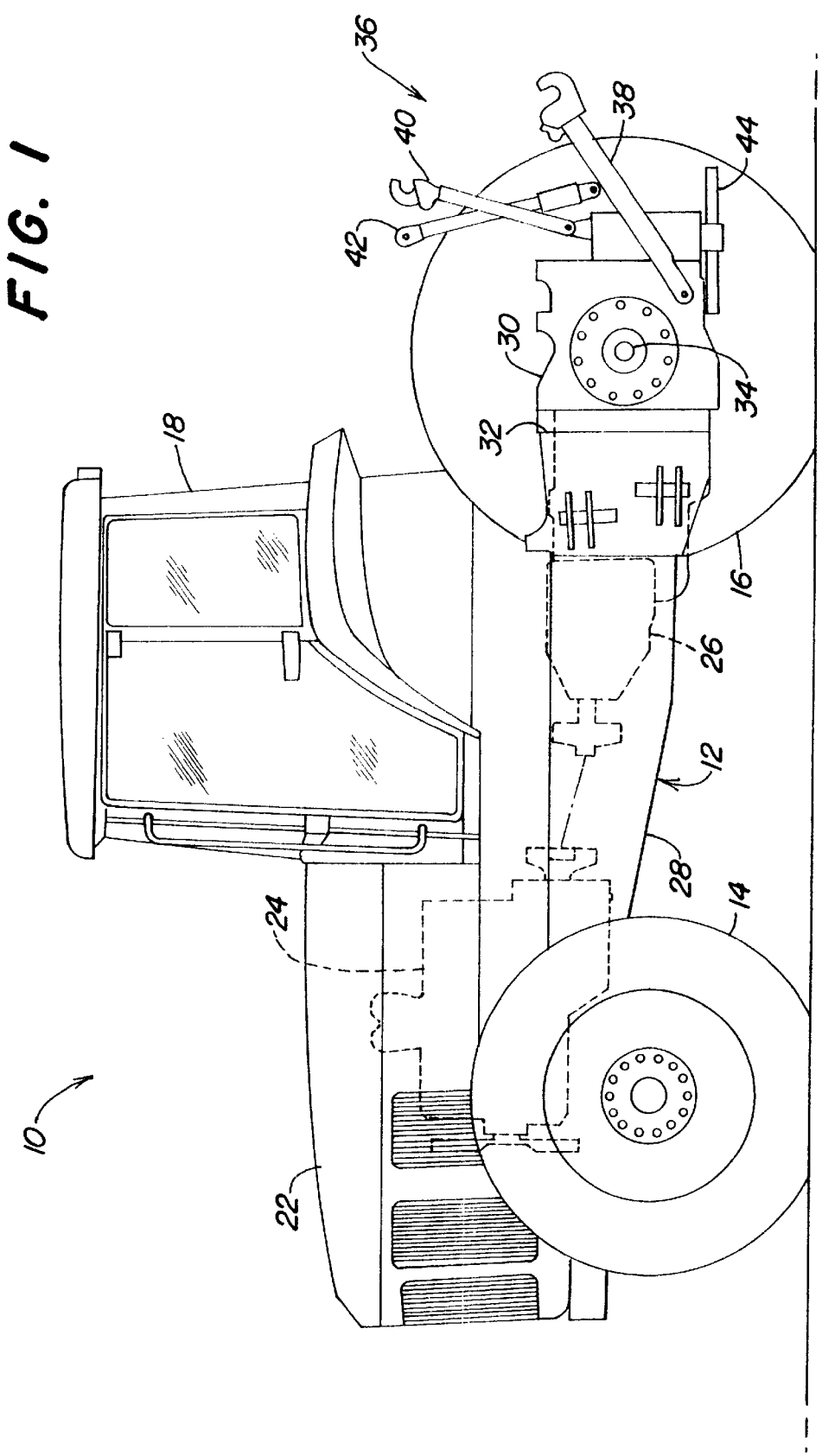
FIG. 1 is a side view of the agricultural tractor of the present invention having a draft compensation rear suspension.

An agricultural tractor 10 according to the present invention is shown in FIG. 1. The tractor 10 includes a frame 12, front wheels and tires 14, rear wheels and tires 16 and a cab 18 forming an operator station. A front hood 22 covers an engine 24.

The frame 12 includes a pair of channel members 28 between which a transmission 26 is housed. Only one of the channels is shown in FIG. 1. A rear drive differential case 30 is attached to the rear ends 32 of the steel channels 28 and thus forms a part of the tractor frame structure. The term "frame structure" is used broadly to mean both separate frame elements such as the channels 28 and other structural members mounted thereto such as the differential case and transmission, etc. Some tractors may be designed without separate frame members and form a frame structure entirely of drive train components such as the engine, transmission, front and rear drive differential cases, etc. The differential case 30 houses a rear differential drive that is driven by the transmission 26. The rear differential has left and right outputs 34 to drive the left and right rear wheels 16.

A three-point hitch 36 is mounted to the rear of the differential case 30. The three-point hitch includes a pair of lower draft links 38 and an upper link 40. Lift links 42 are attached to the draft links 38 and extend upwardly therefrom. The lift arms and the rock shaft of a conventional three point hitch are not shown. In addition to the three-point hitch, a drawbar 44 extends rearwardly from the differential case 30. A PTO housing 46 with a PTO shaft 48 is also mounted to the differential case 30.

Figure 2:
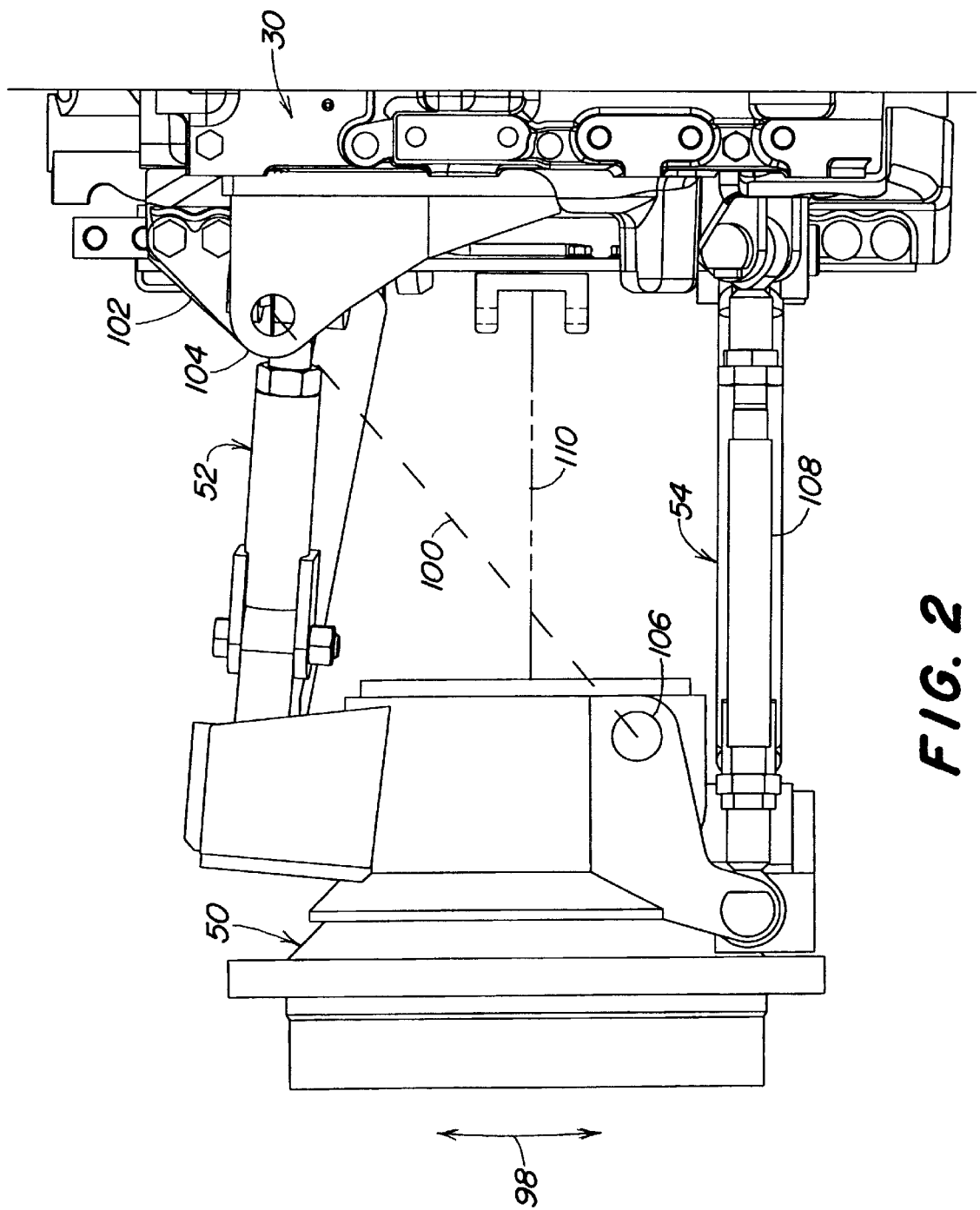
FIG. 2 is a rear view of the left side of the rear suspension.
Figure 3:
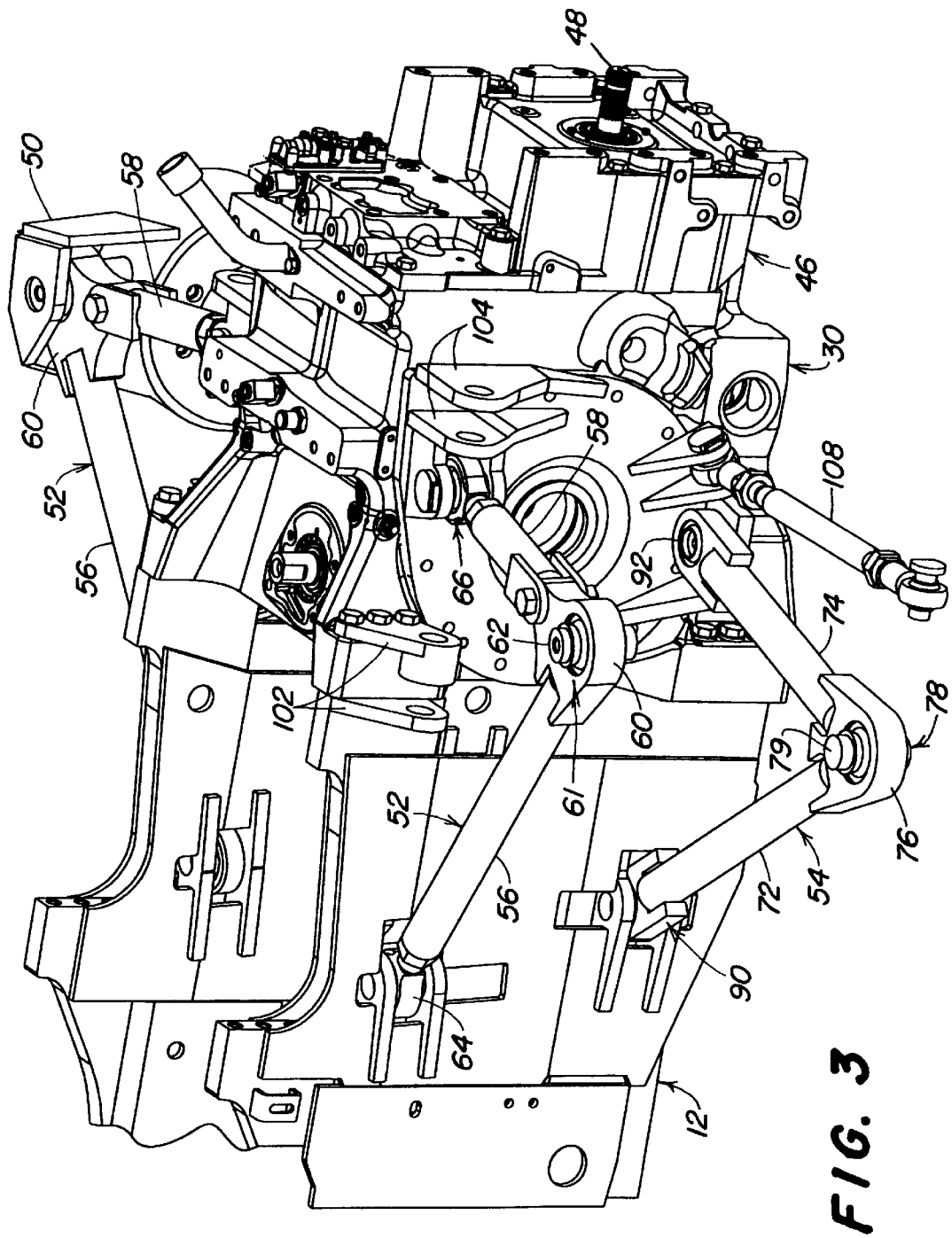
FIG. 3 is a perspective view of the left side rear suspension without the outboard final drive housing.

The rear wheels 16 are mounted to outboard planetary final drives 50, only the left side final drive 50 is shown in FIG. 2. The left and right sides of the rear axle and suspension are substantially identical. The final drive 50 is attached to the frame 12 by upper and lower suspension control arms 52, 54. The upper control arm 52 is generally V-shaped, having a front leg 56 and a rear leg 58. The two legs are joined together at an outboard apex 60 that forms a ball joint 61 having a ball stud 62 that is coupled to the housing of the final drive 50 at the top of the housing. The inboard ends of the legs 56, 58 are joined to the frame 12 by ball joints 64 and 66 respectively. The ball joints 64, 66 include ball studs 68 and 70, respectively, shown in FIG. 4.

The lower control arm 54 is similar to the upper control arm 52, having a front leg 72 and a rear leg 74 joined together at an outboard apex 76. The apex 76 forms a ball joint 78 having a ball stud 79 for attachment to the final drive housing at the bottom of the housing. The legs 72, 74 of the lower control arm are joined to the frame 12 by ball joints 90, 92 having ball studs 94, 96. The ball joints at the inboard and outboard ends of the control arms 52, 54 enable the outboard final drives 50 to move up and down relative to the frame 12, as shown by the double arrow 98 in FIG. 2. One or both of the ball joints at the inner end of each control arm can be replaced with pivot pins.

Vertical loads are transmitted between the differential case 30 and the outboard final drives 50 by front and rear hydraulic cylinders 100, shown only schematically by a phantom line. The front hydraulic cylinder extends between front mounting brackets 102 on the frame 12 and a stud (not shown) on the front of the final drive housing. The rear hydraulic cylinder 100 extends between rear mounting brackets 104 on the differential case and a rear stud 106 on the final drive housing. The hydraulic cylinders 100 are part of a hydraulic circuit that includes a pressure accumulator in a known manner to provide the suspension system with a hydro-pneumatic spring system. Other spring devices can be used in place of the hydraulic cylinders such as metal springs, air bags, etc.

Since the final drive 50 is attached to the upper and lower control arms through ball joints, it is possible to rotate the final drive 50 about a generally upright axis passing through the ball joints 61 and 78. To prevent this rotation, a fixed length link 108 extends between the differential case 30 and the outboard final drive housing 50, rearward of the lower control arm 54.

A drive shaft 110 shown schematically by a phantom line connects the left output 34 from the differential to the final drive 50.

Figure 4:
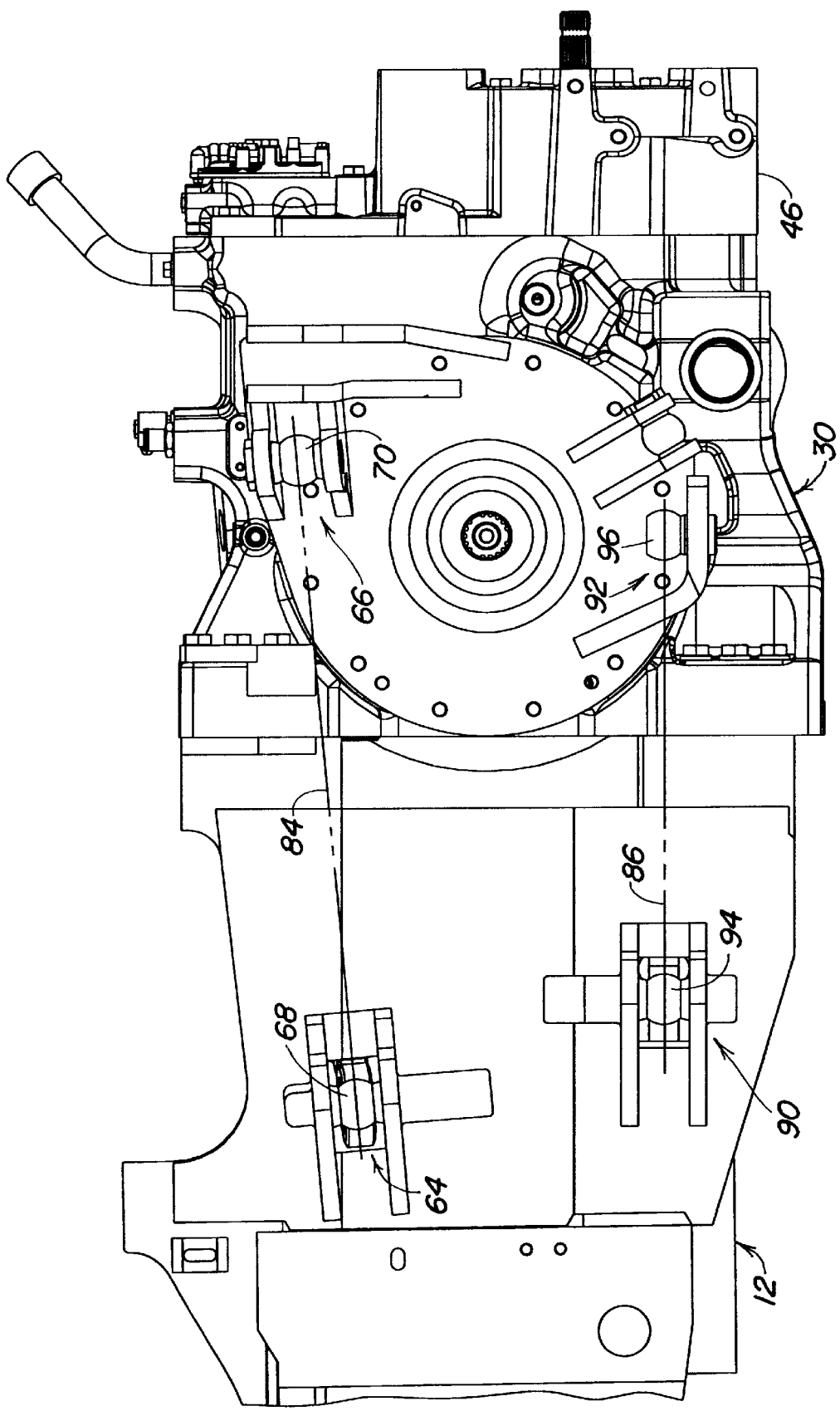
FIG. 4 is a side view of the left side chassis illustrating the connection of the control arms to the tractor frame.

With reference to FIG. 4, the ball joints 64, 66 that attach the upper control arm 52 to the frame 12 define an upper control arm pivot axis 84. Likewise, the lower ball joints 90, 92 define a lower control arm pivot axis 86. The axes 84, 86 converge toward one another, forward of the rear wheels 16 at the side view instantaneous center of the rear suspension. The location of the side view instantaneous center is a critical factor in designing the suspension geometry so that it provides the desired degree of draft compensation as described below.

Figure 5:
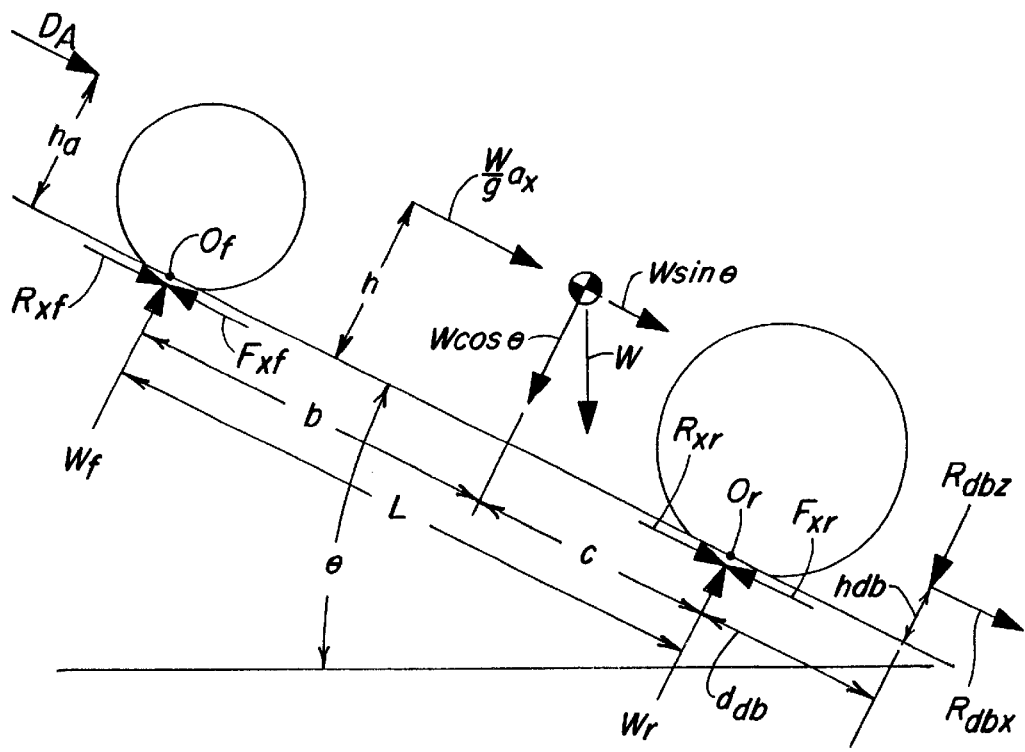
FIG. 5 is a side view free body diagram of the dynamic loads acting on the tractor.

The various loads on a tractor are shown in reference to the free body diagram in FIG. 5. The forces shown in FIG. 5 are as follows:

$D_A$ Aerodynamic drag
$R_{xf}$ Rolling resistance of the front tires
$R_{xr}$ Rolling resistance of the rear tires
$F_{xf}$ Longitudinal force at the front tires (traction)
$F_{xr}$ Longitudinal force at the rear tires (traction)
$W_f$ Load on the front wheel
$W_r$ Load on the rear wheel
$W$ Total Vehicle weight
$a_x$ Longitudinal acceleration
$R_{dbx}$ Longitudinal drawbar load
$R_{dbz}$ Vertical drawbar load
$\theta$ Angle of slope Assuming the tractor does not accelerate in pitch, the load on the front axle can be found by summing moments about the point $O_r$, with clockwise moments being positive:

$$W_f L + D_A h_a + \frac{W a_x h}{g} + R_{dbx} h_{db} + R_{dbz} d_{db} + Wh\sin\theta - Wc\cos\theta = 0 \quad 1)$$

Solving for the load on the front axle:

$$W_f = \frac{1}{L}\left(Wc\cos\theta - D_A h_a - \frac{W a_x h}{g} - R_{dbx} h_{db} - Wh\sin\theta\right) \quad 2)$$

The load on the rear axle can be found by summing moments about the point $O_f$.

$$D_A h_a + \frac{Wa_x h}{g} + R_{dbx}h_{db} + R_{dbz}(d_{db}+L) - W_r L + Wh\sin\theta + Wb\cos\theta = 0 \quad 3)$$

Solving for load on rear axle:

$$W_r = \frac{1}{L}\left(Wb\cos\theta + D_A h_a + R_{dbx}h_{db} + R_{dbz}(d_{db}+L) + Wh\sin\theta + \frac{Wa_x h}{g}\right) \quad 4)$$

For static loads on a level ground, $\theta$, $D_A$, $R_{dbx}$, $R_{dbz}$ and $a_x$ all equal zero, thus:

$$W_f = W_{fs} = W\frac{c}{L} \quad 5)$$

$$W_r = W_{rs} = W\frac{b}{L} \quad 6)$$

For low speed accelerations on level ground $\theta$ and $D_A$ equal zero then:

$$W_f = W\frac{c}{L} - R_{dbx}\frac{h_{db}}{L} - R_{dbz}\frac{d_{db}}{L} - \frac{Wa_x}{g}\frac{h}{L} \quad 7)$$

$$W_r = W\frac{b}{L} + R_{dbx}\frac{h_{db}}{L} + \frac{R_{dbz}(d_{db}+L)}{L} + \frac{Wa_x}{g}\frac{h}{L} \quad 8)$$

Figure 6:
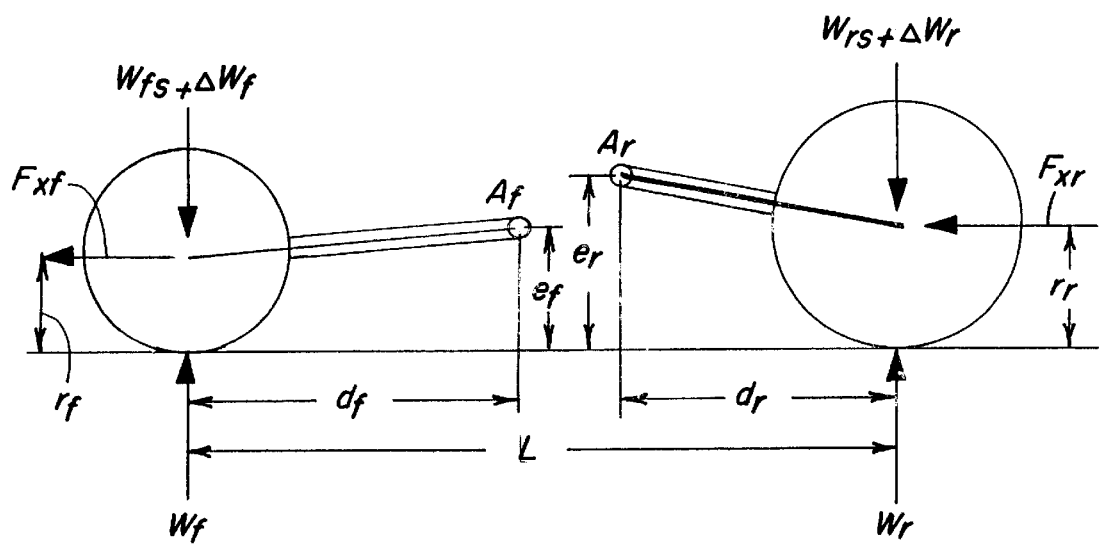
FIG. 6 is a side view schematic representing the suspension system.

Since any suspension is equivalent to a trailing arm, the pitch control performance can be quantified by analyzing the free body diagram of the suspension shown in FIG. 6. In FIG. 6, points $A_f$ and $A_r$ are the virtual pivot points of the front and rear suspensions on the vehicle body. Since the arm is rigidly attached to the axle (resisting axle wind up), it has the ability to transmit a vertical force to the sprung mass which can be designed to counteract draft loads that compress the rear suspension.

The sum of the moments about $A_f$ or $A_r$ must be zero when the system is in equilibrium. Note that the rear load is characterized as a static component, $W_{rs}$, plus a dynamic component, $\Delta W_r$, rising from longitudinal load transfer. For simplicity, axle weights are neglected. Counter-clockwise torque's are positive.

$$\Sigma M_{Ar} = W_r d_r - W_{rs} d_r - \Delta W_r d_r - F_{xr}(e_r - r_r) = 0 \quad 9)$$

$$\Sigma M_{Af} = -W_f d_f + W_{fs} d_f + \Delta W_f d_f - F_{xf}(e_f - r_f) = 0 \quad 10)$$

Where:
  $W_{fs}$ and $W_{rs}$ are the static loads on the front and rear axles and suspensions respectively.
  $\Delta W_f$ and $\Delta W_r$ are the dynamic changes in front and rear suspension loads respectively.
  $r_f$ and $r_r$ are the rolling radii of the front and rear tires respectively.
  Solving equation 9 for $\Delta W_r$:

$$\Delta W_r = W_r - W_{rs} - F_{xr}\left(\frac{e_r - r_r}{d_r}\right) = k_r \delta_r \quad 11)$$

Where:
  $k_r$ is the rear suspension spring rate.
  $\delta_r$ is the rear suspension deflection (positive jounce).

Then substituting $$W\frac{b}{L}$$

for $W_{rs}$ from equation 6 and $$W_r = W\frac{b}{L} + R_{dbx}\frac{h_{db}}{L} + R_{dbz}\frac{(d_{db}+L)}{L} + \frac{Wa_x}{g}\frac{h}{L}$$

$$\Delta W_r = R_{dbx}\frac{h_{db}}{L} + R_{dbz}\frac{(d_{db}+L)}{L} + \frac{Wa_x}{g}\frac{h}{L} - F_{xr}\left(\frac{e_r - r_r}{d_r}\right) \quad 12)$$

Since:

$$F_{xr} = (1-\xi)\left(R_{dbx} + \frac{Wa_x}{g}\right) = (1-\xi)F_x \quad 13)$$

Where:
  $\xi$ is the fraction of the total tractive force developed on the front tires.
  $F_x$ is the total tractive force developed by the tractor.
  Therefore:

$$\Delta W_r = R_{dbx}\frac{h_{db}}{L} + R_{dbz}\frac{(d_{db}+L)}{L} + \frac{Wa_x}{L}\frac{h}{L} - (1-\xi)F_x\left(\frac{e_r - r_r}{d_r}\right) = k_r\delta_r \quad 14)$$

Solving equation 10 for $\Delta W_f$:

$$\Delta W_f = W_f - W_{fs} + F_{xf}\left(\frac{e_f - r_f}{d_f}\right) = k_f \delta_f \quad 15)$$

Where:
  $k_f$ equals the front suspension spring rate
  $\delta_f$ equals the front suspension deflection (positive jounce).
  Substituting $$W_{fs} = W\frac{c}{L}$$

from equation 5 and $$W_f = \frac{Wc}{L} - R_{dbx}\frac{h_{db}}{L} - R_{dbz}\frac{d_{db}}{L} - \frac{Wa_x}{g}\frac{h}{L}$$

from equation 7, results in:

$$\Delta W_f = -R_{dbx}\frac{h_{db}}{L} - R_{dbz}\frac{d_{db}}{L} - \frac{Wa_x}{g}\frac{h}{L} + F_{xf}\left(\frac{e_f - r_f}{d_f}\right) \quad 16)$$

Since:

$$F_{xf} = \xi F_x = \xi\left(R_{dbx} + \frac{Wa_x}{g}\right) \quad 17)$$

Where $\xi$ is the fraction of the total tractive force developed on the front tires. Therefore:

$$\Delta W_f = -R_{dbx}\frac{h_{db}}{L} - R_{dbz}\frac{d_{db}}{L} - \frac{Wa_x}{g}\frac{h}{L} + \xi F_x\left(\frac{e_f - r_f}{d_f}\right) = k_f \delta_f \qquad 18)$$

The pitch angle of the tractor, $\theta_p$, is simply the sum of the suspension deflection divided by the wheel base.

$$\theta_p = \frac{\delta_r - \delta_f}{L} \qquad 19)$$

Substituting into equation 19, equations 14 and 18 for $\delta_r$ and $\delta_f$ results in:

$$\theta_p = \qquad 20)$$

$$\frac{1}{L}\frac{R_{dbx}}{k_r}\frac{h_{db}}{L} + \frac{1}{L}\frac{R_{dbz}}{k_r}\frac{(d_{db}+L)}{L} + \frac{1}{L}\frac{Wa_x}{gk_r}\frac{h}{L} - \frac{1}{L}(1-\xi)\frac{F_x}{k_r}\left(\frac{e_r - r_r}{d_r}\right) +$$

$$\frac{1}{L}\frac{R_{dbx}}{k_f}\frac{h_{db}}{L} + \frac{1}{L}\frac{R_{dbz}}{k_f}\frac{d_{db}}{L} + \frac{1}{L}\frac{Wa_x}{gk_f}\frac{h}{L} - \frac{1}{L}\xi\frac{F_x}{k_f}\left(\frac{e_f - r_f}{d_f}\right)$$

For field operations, quasi-steady state conditions exist, and $a_x = 0$. Then $\theta_p$ becomes:

$$\theta_p = \frac{1}{L}\frac{R_{dbx}}{k_r}\frac{h_{db}}{L} + \frac{1}{L}\frac{R_{dbz}}{k_r}\frac{(d_{db}+L)}{L} - \frac{1}{L}(1-\xi)\frac{F_x}{k_r}\left(\frac{e_r - r_r}{d_r}\right) + \qquad 21)$$

$$\frac{1}{L}\frac{R_{dbx}}{k_f}\frac{h_{db}}{L} + \frac{1}{L}\frac{R_{dbz}}{k_f}\frac{d_{db}}{L} - \frac{1}{L}\xi\frac{F_x}{k_r}\left(\frac{e_f - r_f}{d_f}\right)$$

Since $F_x = R_{dbx}$:

$$\theta_p = \frac{1}{L}\frac{R_{dbx}}{k_r}\frac{h_{db}}{L} + \frac{1}{L}\frac{R_{dbz}}{k_r}\frac{(d_{db}+L)}{L} - \frac{1}{L}(1-\xi)\frac{R_{dbx}}{k_r}\left(\frac{e_r - r_r}{d_r}\right) + \qquad 22)$$

$$\frac{1}{L}\frac{R_{dbx}}{k_f}\frac{h_{db}}{L} + \frac{1}{L}\frac{R_{dbz}}{k_f}\frac{d_{db}}{L} - \frac{1}{L}\xi\frac{R_{dbx}}{k_f}\left(\frac{e_f - r_f}{d_f}\right)$$

Since the suspension reacts the torque of the outboard planetary final drive 50 of the tractor 10, $r_r = r_f = 0$. $\theta_p$ becomes:

$$\theta_p = \frac{1}{L}\frac{R_{dbx}}{k_r}\frac{h_{db}}{L} + \frac{1}{L}\frac{R_{dbz}}{k_r}\frac{(d_{dbz}+L)}{L} - \qquad 23)$$

$$\frac{1}{L}(1-\xi)\frac{R_{dbx}}{k_r}\frac{e_r}{d_r} + \frac{1}{L}\frac{R_{dbx}}{k_f}\frac{h_{db}}{L} + \frac{1}{L}\frac{R_{dbz}}{k_f}\frac{d_{db}}{L} - \frac{1}{L}\xi\frac{R_{dbx}}{k_f}\frac{e_f}{d_f}$$

Since:

$$R_{dbx} = R_{db}\cos\beta$$

$$R_{dbz} = R_{db}\sin\beta$$

Where:

$R_{db}$ is the drawbar pull $\beta$ is the angle of the drawbar pull with respect to the vehicle horizontal axis.

For small angles of $\beta$, $\sin\beta \Rightarrow 0$ and the $\cos\beta \Rightarrow 1$.

$$\theta_p = \frac{1}{L}\frac{R_{db}}{k_r}\frac{h_{db}}{L} - \frac{1}{L}(1-\xi)\frac{R_{db}}{k_r}\frac{e_r}{d_r} + \frac{1}{L}\frac{R_{db}}{k_f}\frac{h_{db}}{L} - \frac{1}{L}\xi\frac{R_{db}}{k_f}\frac{e_f}{d_f} \qquad 24)$$

-continued $$\theta_p = \frac{1}{L}R_{db}\left[\frac{1}{k_r}\frac{h_{db}}{L} - \frac{1}{L}(1-\xi)\frac{1}{k_r}\frac{e_r}{d_r} + \frac{1}{k_f}\frac{h_{db}}{L} - \xi\frac{1}{k_f}\frac{e_f}{d_f}\right] \qquad 25)$$

For the pitch angle to be zero, the term in brackets must equal zero.

$$0 = \frac{h_{db}}{L} - (1-\xi)\frac{e_r}{d_r} + \frac{k_r}{k_f}\frac{h_{db}}{L} - \xi\frac{k_r}{k_f}\frac{e_f}{d_f} \qquad 26)$$

$$\frac{e_r}{d_r} = \frac{1}{(1-\xi)}\left[\frac{h_{db}}{L} + \frac{k_r}{k_f}\frac{h_{db}}{L} - \xi\frac{k_r}{k_f}\frac{e_f}{d_f}\right] \qquad 27)$$

Figure 7:
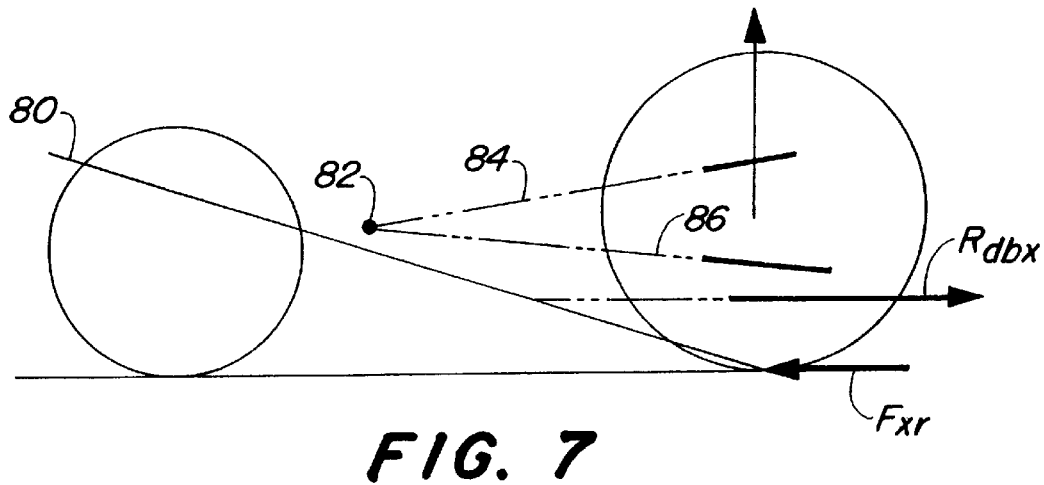
FIGS. 7 and 8 are side schematics of tractors illustrating two different degrees of draft compensation.

The equation 27 defines a line 80 shown in FIG. 7 that extends from the center of the rear tire patch upward and forward. If the side view instantaneous center of the rear suspension, 82, is located on this line, the suspension geometry will produce a 100% compensation of the draft forces, resulting in no rear suspension compression or extension when the tractor produces a draft force. As a result, the line 80 is referred to as the "100% draft compensation line".

Figure 8:
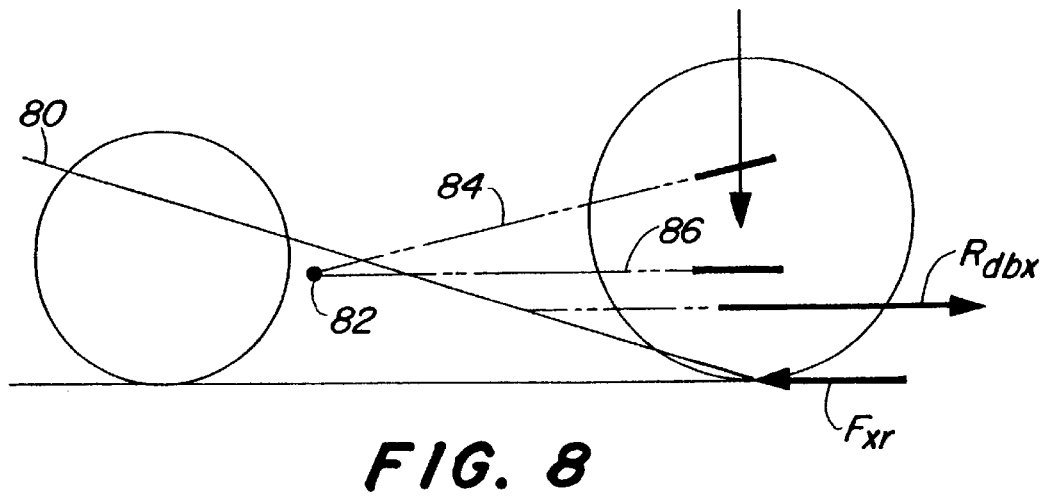

The side view instantaneous center of the rear suspension is the point of intersection 82 of the pivot axis 84 of the upper control arm and the pivot axis 86 of the lower control arm. In FIG. 7, the instantaneous center 82 is located above the line 80. This is the lift zone where the draft force will produce an extension of the rear suspension. In FIG. 8, the instantaneous center 82 is located below the 100% draft compensation line and is in the compression zone. A draft force will result in compression of the rear suspension. The further the instantaneous center 82 is from the 100% draft compensation line, the greater the effect of the draft load on the suspension system.

The amount of draft compensation can be quantified by:

$$\frac{\frac{e_r}{d_r}\text{actual}}{\frac{e_r}{d_r}100\%\text{ draft compensation}} \times 100 = \% \text{ draft compensation} \qquad 28)$$

If the location of the instantaneous center produces, for example, 60% draft compensation, then 60% of the draft load is compensated by an opposing force that counteracts compression or extension of the suspension. The remaining 40% of the draft force will result in suspension compression and can be partially or totally reacted by the suspension load leveling system, depending on the leveling system design. Some compression is desired as it is the expected response of a tractor to a draft load, resulting from tire compression in non-suspended tractors. Load leveling will increase the suspension spring rate, but not nearly as much as would be required if the load leveling system reacted to the entire draft force. With a draft compensating suspension geometry, a less complex load leveling system is needed and requires less power to operate. Load leveling suspension systems are generally known.

The line 80 defined by the equation 27 above provides draft compensation for the horizontal component of the draft force. If the angle $\beta$ (the draft force angle to horizontal) is a value other than zero, there will be both horizontal and vertical components to the draft force. Only the horizontal component is compensated for by the suspension geometry. As noted above, the compensation may be full or partial, depending on the location of the suspension instantaneous center relative to the line of 100% compensation. The vertical component of the draft force will act to compress or extend the rear suspension, depending on the direction of the vertical draft component. The effect of the vertical component on the tractor attitude may be reduced, or eliminated, by a load leveling system. Since the suspension instantaneous center is fixed on the tractor, the percentage of the total draft [compensation] that is compensated by the suspension geometry varies as a function of the angle β. The exact amount of draft compensation will vary depending on the particular implement and angle β of the draft force produced by the implement. Accordingly, the amount of draft compensation is usually expressed as a range.

If the suspension did not have a load leveling system, the suspension geometry could be designed with the instantaneous center above the line of 100% draft compensation to produce a suspension extension to counter a vertical draft component to control the vehicle attitude. This can be expressed as a draft compensation value that is greater than 100%.

The equation 27 above results from equation 22 where $r_r$ and $r_f=0$ in the case of an outboard planetary final drive. For a tractor having an inboard final drive, equation 22 would resolve differently for the slope of the 100% draft compensation line since the dimensions $r_r$ and $r_f$ are the rolling radii of the tires.

The desired percentage of draft compensation produced by the suspension geometry will vary depending upon the tractor design, the total amount of tire motion available through the suspension system, the suspension spring rate and the load leveling system. Where greater suspension travel is available, a lower amount of draft compensation may be needed to still have sufficient suspension travel to traverse an uneven terrain. Where a relatively large amount of suspension travel is available, a suspension geometry providing 30% draft compensation may be adequate. The tractor 10 above has draft compensation between 40–60%. However, where the suspension travel is smaller, draft compensation between 60–80% may be required to insure adequate suspension travel remains for traversing a rough terrain.

The draft compensating suspension of the present invention on an agricultural tractor enables the implement hitch to be mounted on the suspended frame of the tractor and avoid the negative consequences of the draft load reacting through the suspension to either compress or extend the suspension. The suspension allows the implement to be suspended as well, providing greater control over the implement operation.

The invention should not be limited to the above-described embodiment, but should be limited solely by the claims that follow.

We claim:

1. An agricultural tractor comprising:
   a frame;
   left and right front and rear wheels and tires;
   an implement hitch mounted to the frame;
   a resilient suspension coupling the rear wheels and tires to the frame, the suspension having a geometry to compensate for the effects of a horizontal draft load applied to the frame through the implement hitch to minimize compression or extension of the suspension induced by the horizontal draft load, the percentage of draft compensation according to said geometry being at least 30% and determined by:

$$\frac{\frac{e_r}{d_r} \text{actual}}{\frac{e_r}{d_r} 100\% \text{ draft compensation}} \times 100 = \% \text{ draft compensation}$$

where
   $d_r$ is a horizontal distance of a rear suspension side view instantaneous center forward from the center of the rear wheels;
   $e_r$ is a vertical distance of the rear suspension side view instantaneous center above the ground, and
the dimensions $e_r$ and $d_r$ for 100% draft compensation are the dimensions $e_r$ and $d_r$ that produce an angle $\theta_p$ equal to zero in the following equation $$\theta_p = \frac{1}{L}\frac{R_{dbx}}{k_r}\frac{h_{db}}{L} + \frac{1}{L}\frac{R_{dbz}}{k_r}\frac{(d_{db}+L)}{L} - \frac{1}{L}(1-\xi)\frac{R_{dbx}}{k_r}\left(\frac{e_r-r_r}{d_r}\right) + \frac{1}{L}\frac{R_{dbx}}{k_f}\frac{h_{db}}{L} + \frac{1}{L}\frac{R_{dbz}}{k_f}\frac{d_{db}}{L} - \frac{1}{L}\xi\frac{R_{dbx}}{k_f}\left(\frac{e_f-r_f}{d_f}\right)$$

where
   $R_{dbx}$ is a horizontal hitch load
   $R_{dbz}$ is a vertical hitch load
   $h_{db}$ is a vertical height of a drawbar of the hitch
   $d_{db}$ is a rearward position of hitch load from the center of the rear wheels
   L is a wheelbase
   $k_r$ is a rear suspension spring rate
   $k_f$ is a front suspension spring rate
   $\xi$ is a fraction of the total tractive force developed on the front tires
   $d_f$ is a horizontal distance of a front suspension side view instantaneous center rearward from the center of the front wheels
   $r_f$, $r_r$ are rolling radii for the front and rear tires, respectively, and
   $e_f$ is a vertical distance of the front suspension side view instantaneous center above the ground.

2. The agricultural tractor as defined by claim 1 wherein the rear suspension side view instantaneous center is located to produce 40–60% draft compensation.

3. The agricultural tractor as defined by claim 1 wherein the rear suspension side view instantaneous center is located to produce 60–80% draft compensation.

4. The agricultural tractor as defined by claim 1 further comprising left and right rear wheel outboard planetary drives movable together with the respective left and right rear wheels relative to the frame.

5. The agricultural tractor as defined by claim 1 wherein:
   the frame includes a rear drive differential case having left and right outputs; and,
   the rear suspension includes, on each side, an upper and a lower control arm pivotally mounted to the frame and extending outwardly therefrom to distal ends and an outboard final drive housing at the distal ends of the control arms.

6. The agricultural tractor as defined by claim 5 wherein the upper and lower control arms pivot about upper and lower control arm pivot axes which converge toward one another forward of the rear wheels at the side view instantaneous center of the rear suspension.

7. The agricultural tractor as defined by claim 1 wherein the implement hitch includes a pair of lower draft links each having a front and a rear end with the front ends coupled to the frame.

* * * * *